(12) United States Patent
Wong et al.

(10) Patent No.: US 7,933,408 B2
(45) Date of Patent: Apr. 26, 2011

(54) ASYNCHRONOUS DOWNLOAD

(75) Inventors: Curtis G. Wong, Medina, WA (US);
Dale A. Sather, Seattle, WA (US);
Kenneth Reneris, Clyde Hill, WA (US);
Thaddeus C. Pritchett, Edmonds, WA (US); Talal Ali Batrouny, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 782 days.

(21) Appl. No.: 11/764,065

(22) Filed: Jun. 15, 2007

(65) Prior Publication Data
US 2008/0310627 A1    Dec. 18, 2008

(51) Int. Cl.
*H04N 7/167* (2011.01)
*H04K 1/04* (2006.01)
*H04K 1/06* (2006.01)
*H04L 9/00* (2006.01)
*H04L 9/08* (2006.01)
*G06F 21/00* (2006.01)

(52) U.S. Cl. ............ 380/200; 380/277; 380/35; 380/44; 380/218; 380/279; 705/51

(58) Field of Classification Search .................. 380/200, 380/277, 218, 44, 273
See application file for complete search history.

(56) References Cited

U.S. PATENT DOCUMENTS

| 6,603,857 | B1 * | 8/2003 | Batten-Carew et al. ........ 380/44 |
| 7,321,660 | B2 * | 1/2008 | Mont et al. ..................... 380/277 |
| 2004/0139024 | A1 * | 7/2004 | So ................................. 705/51 |

* cited by examiner

*Primary Examiner* — Shin-Hon Chen
(74) *Attorney, Agent, or Firm* — Lee & Hayes, PLLC

(57) ABSTRACT

The claimed subject matter provides a system and/or method that asynchronously disseminates multimedia content to disparate clients. The disclosed system can include a component that receives multimedia content supplied by a multimedia publisher, encrypts or applies a time sensitive lock to the received multimedia content, disseminates the encrypted or locked multimedia content to the disparate clients, and a time subsequent, generates and distributes to the disparate clients a counterpart to the time sensitive lock necessary to unlock and play the disseminated and encrypted or locked multimedia content on the clients.

17 Claims, 8 Drawing Sheets

ASYNCHRONOUS DOWNLOAD

BACKGROUND

In order to remain competitive in the home entertainment industry, manufacturers and service providers are increasing efforts to develop improved entertainment systems. A rapidly evolving type of entertainment system relates to a personal video recorder system. A personal video recorder system includes a large digital data storage device, such as a hard disk drive, for storing recorded audio and/or video programming in a digital format (without a videotape). The storage device enables the viewer to efficiently implement a time shifting function so that the viewer can watch the recorded program at a more convenient time. The personal video recorder system receives broadcast programs from a service provider, such as in the form of cable television, satellite, or other source of programming. The personal video recorder system also may employ a video compression system (e.g., an MPEG-2 format) in combination with an analog to digital converter for converting analog broadcast signals into a suitable digital format. Alternatively and/or additionally, the personal video recorder system may receive broadcast signals in digital format.

Current digital rights management schemes as applied to personal video recorders and/or re-broadcast services are deficient in that they typically cannot handle time released distributions of multimedia content. For example, current digital rights management schemes cannot distribute multimedia content to a multitude of receptive clients for release, playback and/or re-distribution on some future date. Rather what transpires today is that as soon as multimedia content is distributed from a secure distribution center the content immediately becomes available; there currently does not exist a facility and/or mechanism that can release the content in a controlled time centric manner.

SUMMARY

The following presents a simplified summary in order to provide a basic understanding of some aspects of the disclosed subject matter. This summary is not an extensive overview, and it is not intended to identify key/critical elements or to delineate the scope thereof. Its sole purpose is to present some concepts in a simplified form as a prelude to the more detailed description that is presented later.

The claimed subject matter relates to a novel digital rights management scheme that facilitates control of when content can be viewed, and enhances distribution of such content. More particularly, content is encrypted so that it cannot be viewed until a pre-determined time. The content can be distributed and downloaded in advance, but can only be viewed after decryption, and the encryption methodology is time-centric. For example, content (e.g., a movie, or first run sitcom, etc.) can be downloaded in advance along with a token or key that provides for decrypting the content. The token or key can sync with a remote server and at a pre-determined time unlock the content so that it can be viewed. The content cannot be viewed prior to the pre-determined time. Accordingly, broadcast media, movies, and the like, can be distributed to users a priori (thus overcoming constraints associated with bandwidth limitations, large content (high definition movies)) and control when the users are able to view such content. The claimed invention facilitates and effectuates efficient downloading/storing of content to personal video recorder/re-broadcast service (e.g., during off-peak hours) while preserving integrity of first time viewing for content providers.

To the accomplishment of the foregoing and related ends, certain illustrative aspects of the disclosed and claimed subject matter are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
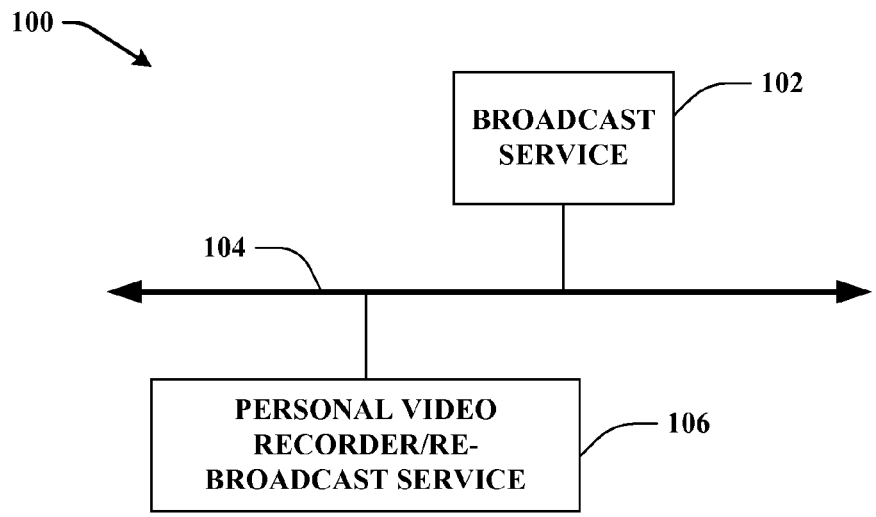
FIG. 1 illustrates a system that asynchronously distributes multimedia content in accordance with the claimed subject matter.

The subject matter as claimed is now described with reference to the drawings, wherein like reference numerals are used to refer to like elements throughout. In the following description, for purposes of explanation, numerous specific details are set forth in order to provide a thorough understanding thereof. It may be evident, however, that the claimed subject matter can be practiced without these specific details. In other instances, well-known structures and devices are shown in block diagram form in order to facilitate a description thereof.

FIG. 1 illustrates a system 100 that asynchronously distributes multimedia content. System 100 can include broadcast service 102 that collects diverse and disparate multimedia program content (e.g., movies, multimedia presentations, audio clips, music albums, pod casts, etc.) from multimedia production facilities, such as television broadcast studios, movie studios, and/or music recording and distribution facilities, and the like, encrypts and locks the received content with one or more encryption and/or time sensitive keys, distributes the encrypted and locked content, and subsequently disseminates an appropriate key, and/or generates and broadcasts a time signal, to unlock the encrypted and locked content at some point in time in the future. As illustrated broadcast service 102 can be any type of machine, or reside on any type of machine, that includes a processor. Illustrative machines that can constitute broadcast service 102 can include Personal Digital Assistants (PDAs), cell phones, smart phones, laptop computers, notebook computers, consumer devices/appliances, industrial automation devices, automotive components, aviation components, hand-held devices, desktop computers, server computing devices, etc. Broadcast server 102, as depicted, can be in continuous and operative, or sporadic but intermittent communication via network topology 104 with personal video recorder/broadcast service 106.

As stated supra, broadcast service 102 can collect diverse media presentations from a multitude of multimedia producers, and thereafter encrypt and/or lock the collected and/or obtained media presentations with, for example, a time sensitive lock that can include broadcast service 102's unique credential information (e.g., IP address, Media Access Control (MAC) address, domain name, and the like) and/or encryption key. Additionally, broadcast service 102 can distribute the encrypted and/or locked media content to personal video recorder/rebroadcast service 106, and can further on a periodic basis transmit time signals and/or key information necessary to unlock encrypted and/or locked media presentations that have been persisted on various client machines (e.g., personal video recorder/rebroadcast service 106).

Network topology 104 can include any viable communication technology, for example, wired and/or wireless modalities and/or technologies can be employed to effectuate the subject matter as claimed. Moreover, network topology 104 can include utilization of Personal Area Networks (PANs), Local Area Networks (LANs), Campus Area Networks (CANs), Metropolitan Area Networks (MANs), Extranets, intranets, the Internet, Wide Area Networks (WANs)—both centralized and distributed—and/or any combination, permutation, and/or aggregation thereof. Additionally and/or alternatively, network topology 104 can employ power (electricity) line communications wherein power distribution wires are employed for both the simultaneous distribution of data as well as transmission of power (electricity).

Personal video recorder/rebroadcast service 106, like broadcast service 102, can be any type of machine that includes a processor and is capable of effective communication with network topology 104. Machines that can comprise personal video recorder/rebroadcast service 106 can include desktop computers, server class computing machines, cell phones, smart phones, laptop computers, notebook computers, Tablet PCs, consumer and/or industrial devices and/or appliances, automotive accessories, aviation equipment, hand-held devices, and the like.

Personal video recorder/rebroadcast service 106 can be a standalone set-top box, or a portable recording and/or playback device. Additionally and/or alternatively, personal video recorder/rebroadcast service 106 can be a commercial retransmitter (e.g., an entity one of whose purposes is to receive media content and subsequently forwarded the received content to other rebroadcast services and/or personal video recorders). Additionally, personal video recorder/rebroadcast service 106 can be implemented entirely in software, hardware, and/or a combination of software and/or hardware. Further, personal video recorder/rebroadcast service 106 can be incorporated within and/or associated with other compatible components, such as for instance, televisions, consumer and/or industrial devices and/or appliances that can include processors (e.g., notebook computers, desktop computers, laptop computers, multimedia Internet enabled mobile phones, multimedia players, refrigerators, and the like).

Personal video recorder/rebroadcast service 106 can receive from broadcast service 102, via network topology 104, locked and/or encrypted multimedia program content. Upon receipt of locked and encrypted multimedia program content, personal video recorder/rebroadcast service 106 can persist the received content to associated volatile and/or non-volatile memory that can be electronically erased and/or programmed, and/or non-volatile storage that persists digitally encoded data on rapidly rotating platters with magnetic and/or optically retentive services and/or coatings, and/or magnetic tape, and the like.

Personal video recorder/rebroadcast service 106, subsequent to receipt of locked and/or encrypted multimedia program content can receive keys necessary to unlock and/or decrypt persisted multimedia content. Alternatively and/or additionally, personal video recorder/rebroadcast service 106 can periodically poll broadcast service 102 to elicit an appropriate key and/or time signal needed to unlock and/or decrypt stored multimedia content. Once personal video recorder/rebroadcast service 106 has obtained and/or received appropriate key information from broadcast service 102, personal video recorder/rebroadcast service 106 can activate/unlock appropriate multimedia content and proceed to either playback the multimedia content to associated audio and/or display instrumentalities associated with a personal video recorder (e.g., a audio/visual display) and/or transmit the unlocked and/or activated multimedia content for reception by disparate and diverse receiving devices, such as, televisions, radios, Digital Video Recorders (DVRs), Personal Video Recorders (PVRs), portable multimedia players, cell phones, smart phones, multimedia Internet enabled mobile phones, Personal Digital Assistants (PDAs), laptop computers, notebook computers, server class machines, and the like.

Figure 2:
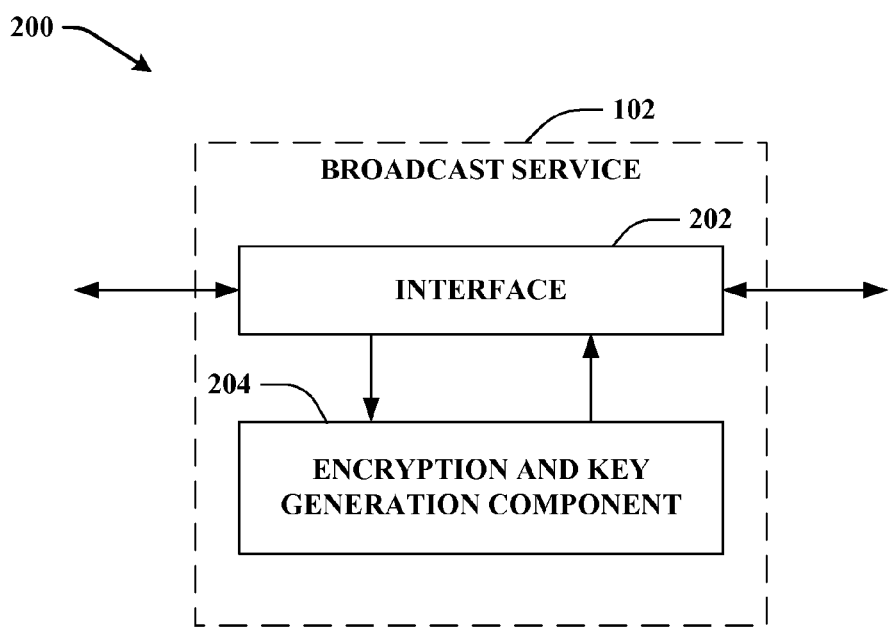
FIG. 2 provides a more detailed illustration of broadcast service in accordance with one aspect of the claimed subject matter.

FIG. 2 provides a more detailed illustration 200 of broadcast service 102 that collects multimedia program content from a multitude of multimedia production facilities, encrypts and/or locks the collected content with encryption and/or time sensitive keys, distributes the locked and encrypted content for storage on client devices (e.g., personal video recorder/rebroadcast service 106), and at a later time disseminates appropriate keying information to unlock the disseminated encrypted and locked content. As illustrated, broadcast service 102 can include interface component 202 (hereinafter referred to as "interface 202") that can be in continuous and/or intermittent communication with personal video recorder/rebroadcast service 106 via network topology 104. Additionally, broadcast service 102 can also include encryption and key generation component 204 that, via interface 202, can receive diverse and disparate multimedia program content from multimedia production facilities such as, movie studios, and/or music recording and distribution facilities, encrypt and/or lock the received and/or obtained content, and disseminate, via interface 202, the locked and/or encrypted content to one or more receptive client (e.g., personal video recorder/re-broadcast service 106).

Interface 202 can receive data from a multitude of sources, such as, for example, data associated with multimedia presentations, client applications, services, users, clients, devices, and/or entities involved with a particular transaction, a portion of a transaction, and thereafter convey the received information to encryption and key generation component 204 for further analysis. Additionally, interface 202 can receive from encryption and key generation component 204 encrypted and/or locked multimedia content, encryption and time-sensitive keys, and/or time-signals needed to unlock and/or decrypt locked and encrypted content for subsequent distribution to receptive clients.

Interface 202 can provide various adapters, connectors, channels, communication pathways, etc. to integrate the various components included in system 200 into virtually any operating system and/or database system and/or with one another. Additionally, interface 202 can provide various adapters, connectors, channels, communication modalities, etc. that provide for interaction with various components that can comprise system 200, and/or any other component (external and/or internal), data and the like associated with system 200.

Encryption and key generation component 204, on receipt of multimedia content, can encrypt and/or lock the received content with one or more encryption and/or time sensitive keys. For instance, encryption and key generation component 204 can encrypt and/or lock the entirety of the received content (e.g., encrypt each and every bit of data included in the multimedia presentation). Alternatively, encryption and key generation component 204 can encrypt and/or lock selective portions of the multimedia presentation. Illustrative encryption and/or locking mechanisms that can be utilized by encryption and key generation component 204 can include public key cryptography (e.g., asymmetric cryptography) wherein pairs of keys—a public key and a private key—are generated and/or disseminated, the private key is kept secret, while the public-key is widely distributed. Encryption and key generation component 204 can also employ single-key, one-key, and/or private key encryption (e.g., symmetric key encryption) wherein trivially related, or identical, cryptographic keys are generated and used for both decryption and/or encryption. It will be appreciated by those cognizant in the art that a combination of asymmetric and symmetric key cryptography can be utilized to effectuate and facilitate the claimed subject matter, and accordingly will fall within the ambit and intent of the subject matter as claimed.

Once encryption and key generation component 204 has completed, or during partial completion of, or concurrently with, the encryption and/or locking of the received content, encryption and key generation component 204 can cause interface 202 to distribute and/or disseminate the resultant encrypted and/or locked multimedia content to receiving client devices (e.g., personal video recorder/rebroadcast service 106). Further, encryption and key generation component 204 can also, at a time subsequent, generate and disseminate key information and/or time signal data that can be used by client devices to unlock and/or decrypt the distributed and/or persisted encrypted and/or locked multimedia content.

Figure 3:
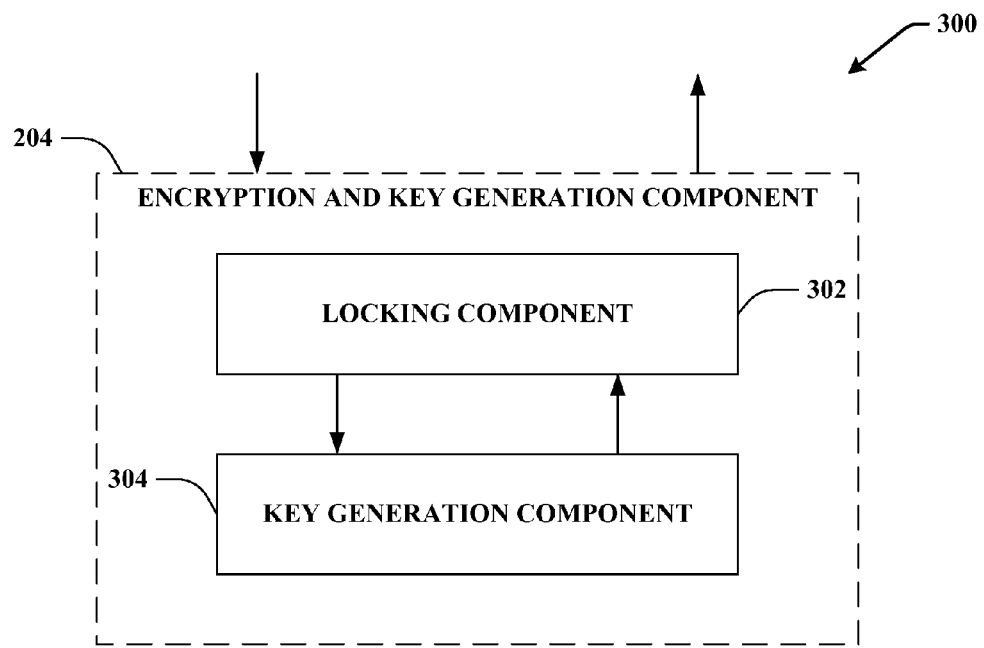
FIG. 3 provides further depiction of illustrative encryption and key generation component in accordance with an aspect of the claimed subject matter.

FIG. 3 provides further depiction 300 of illustrative encryption and key generation component 204. As illustrated, encryption and key generation component 204 can include locking component 302 and key generation component 204. Locking component 302 can encrypt and/or lock multimedia content with one or more encryption and/or time sensitive keys. Locking component 302 can employ public-key cryptography or private key encryption (e.g., symmetric key encryption), or and combination of both public-key cryptography and private key encryption in order to securely lock multimedia content for distribution to clients. Additionally, locking component 302 can, depending on implementation, lock and/or encrypt the entire multimedia presentation bit by bit, and/or locking component 302 can selectively encrypt and/or lock selected portions of the multimedia presentation.

Key generation component 304 can generate keys necessary to unlock and/or decrypt multimedia content that has previously been, or is concurrently being, persisted on storage media associated with personal video recorder/re-broadcast server 106. Additionally, key generation component 304 can also contemporaneously generate keys needed to decrypt and/or unlock multimedia content that is concurrently being both downloaded to personal video recorder/re-broadcast server 106 as well as simultaneously being displayed/played on audio/visual displays associated with, or retransmitted by, personal video recorder/re-broadcast server 106. Additionally and/or alternatively, key generation component 304 can generate and broadcast a periodic time signal that can be utilized by personal video recorder/re-broadcast service to unlock multimedia content when, for example, a time-sensitive lock is utilized. It will be appreciated by those skilled in the art that when time-sensitive locks are utilized that key generation component 304 need only disseminate an appropriate time signal since the unlocking of the time-sensitive lock can be accomplished by the time-signal together with associated broadcast service credentials. In other words, to unlock the time-sensitive lock, for example, both a time signal generated by broadcast service 102 as well as pertinent credential information related to broadcast service is necessary to unlock the multimedia content. In this manner time-sensitive multimedia releases can be preserved.

Figure 4:
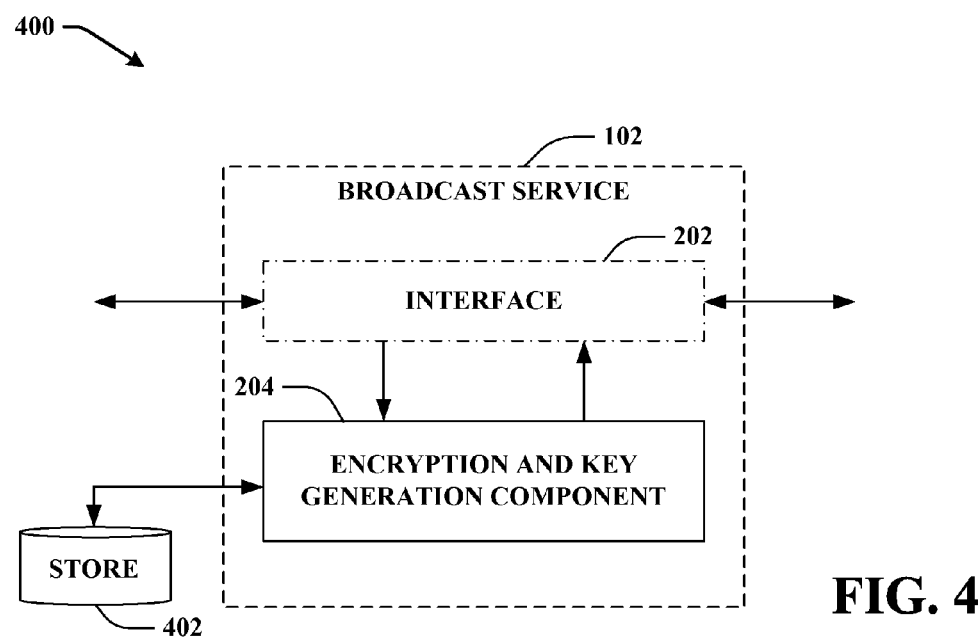
FIG. 4 illustrates a system implemented on a machine that asynchronously distributes multimedia content in accordance with an aspect of the claimed subject matter.

FIG. 4 depicts an aspect of a system 400 that effectuates and facilitates asynchronously download of disparate multimedia content. System 400 can include broadcast service 102 that can comprise interface 202 and encryption and key generation component 204. Additionally, system 400 can include store 402 that can include any suitable data necessary for encryption and key generation component 204 to encrypt and/or lock multimedia content. For instance, store 402 can include information regarding multimedia content, user data, data related to a portion of a transaction, credit information, historic data related to a previous transaction, a portion of data associated with purchasing a good and/or service, a portion of data associated with selling a good and/or service, geographical location, online activity, previous online transactions, activity across disparate network, activity across a network, credit card verification, membership, duration of membership, communication associated with a network, buddy lists, contacts, questions answered, questions posted, response time for questions, blog data, blog entries, endorsements, items bought, items sold, products on the network, information gleaned from a disparate website, information gleaned from the disparate network, ratings from a website, a credit score, geographical location, a donation to charity, or any other information related to software, applications, web conferencing, and/or any suitable data related to transactions, etc.

It is to be appreciated that store 402 can be, for example, volatile memory or non-volatile memory, or can include both volatile and non-volatile memory. By way of illustration, and not limitation, non-volatile memory can include read-only memory (ROM), programmable read only memory (PROM), electrically programmable read only memory (EPROM), electrically erasable programmable read only memory (EEPROM), or flash memory. Volatile memory can include random access memory (RAM), which can act as external cache memory. By way of illustration rather than limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM) and Rambus dynamic RAM (RDRAM). Store 402 of the subject systems and methods is intended to comprise, without being limited to, these and any other suitable types of memory. In addition, it is to be appreciated that store 402 can be a server, a database, a hard drive, and the like.

Figure 5:
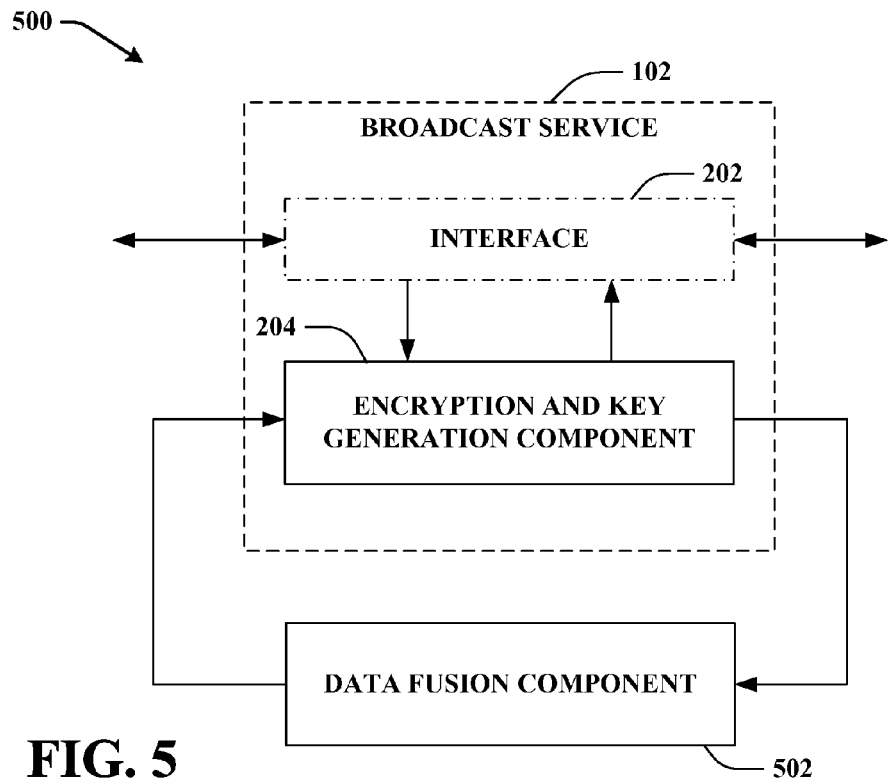
FIG. 5 provides a further depiction of a machine implemented system that asynchronously distributes multimedia content in accordance with an aspect of the subject matter as claimed.

FIG. 5 provides yet a further depiction of a system 500 that effectuates and facilitates the asynchronous download of multimedia presentations in accordance with an aspect of the claimed subject matter. As depicted, system 500 can include a data fusion component 502 that can be utilized to take advantage of information fission which may be inherent to a process (e.g., receiving and/or deciphering inputs) relating to analyzing inputs through several different sensing modalities. In particular, one or more available inputs may provide a unique window into a physical environment (e.g., an entity inputting instructions) through several different sensing or input modalities. Because complete details of the phenomena to be observed or analyzed may not be contained within a single sensing/input window, there can be information fragmentation which results from this fission process. These information fragments associated with the various sensing devices may include both independent and dependent components.

The independent components may be used to further fill out (or span) an information space; and the dependent components may be employed in combination to improve quality of common information recognizing that all sensor/input data may be subject to error, and/or noise. In this context, data fusion techniques employed by data fusion component 502 may include algorithmic processing of sensor/input data to compensate for inherent fragmentation of information because particular phenomena may not be observed directly using a single sensing/input modality. Thus, data fusion provides a suitable framework to facilitate condensing, combining, evaluating, and/or interpreting available sensed or received information in the context of a particular application.

Figure 6:
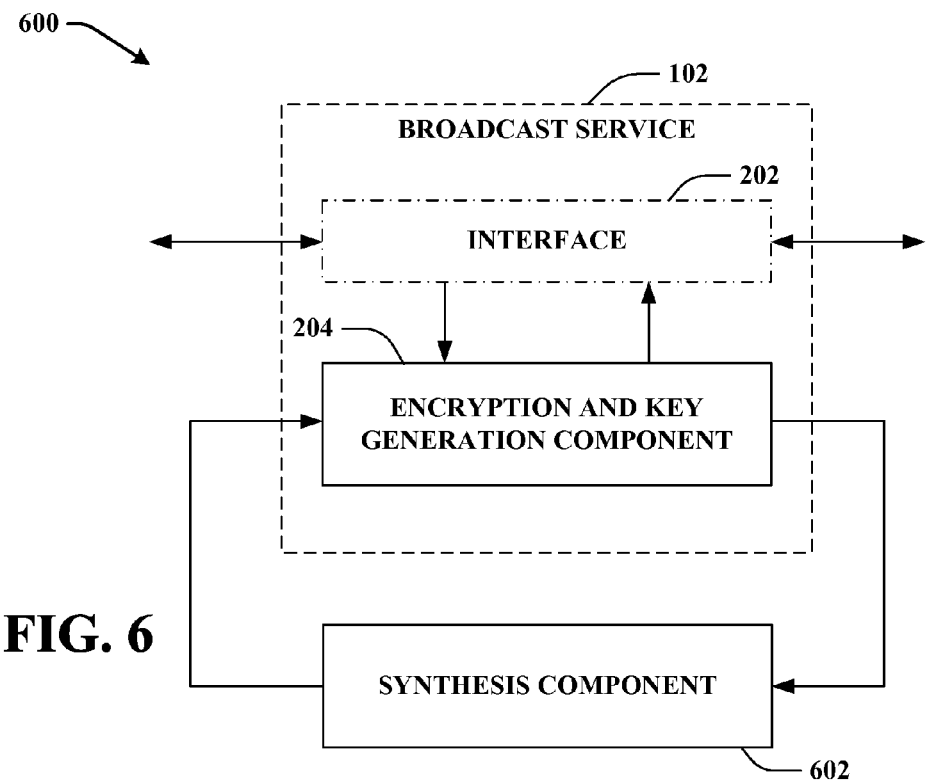
FIG. 6 illustrates yet another aspect of the machine implemented system that asynchronously distributes multimedia content in accordance with an aspect of the claimed subject matter.

FIG. 6 provides a further depiction of a system 600 that effectuates and facilitates asynchronous download of multimedia content from a broadcast service in accordance with an aspect of the claimed subject matter. As illustrated encryption and key generation component 204 can, for example, employ synthesizing component 602 to combine, or filter information received from a variety of inputs (e.g., text, speech, gaze, environment, audio, images, gestures, noise, temperature, touch, smell, handwriting, pen strokes, analog signals, digital signals, vibration, motion, altitude, location, GPS, wireless, etc.), in raw or parsed (e.g. processed) form. Synthesizing component 602 through combining and filtering can provide a set of information that can be more informative, all accurate (e.g., with respect to an entity's communicative or informational goals) and information from just one or two modalities, for example. As discussed in connection with FIG. 5, the data fusion component 502 can be employed to learn correlations between different data types, and the synthesizing component 602 can employ such correlations in connection with combining, or filtering the input data.

Figure 7:
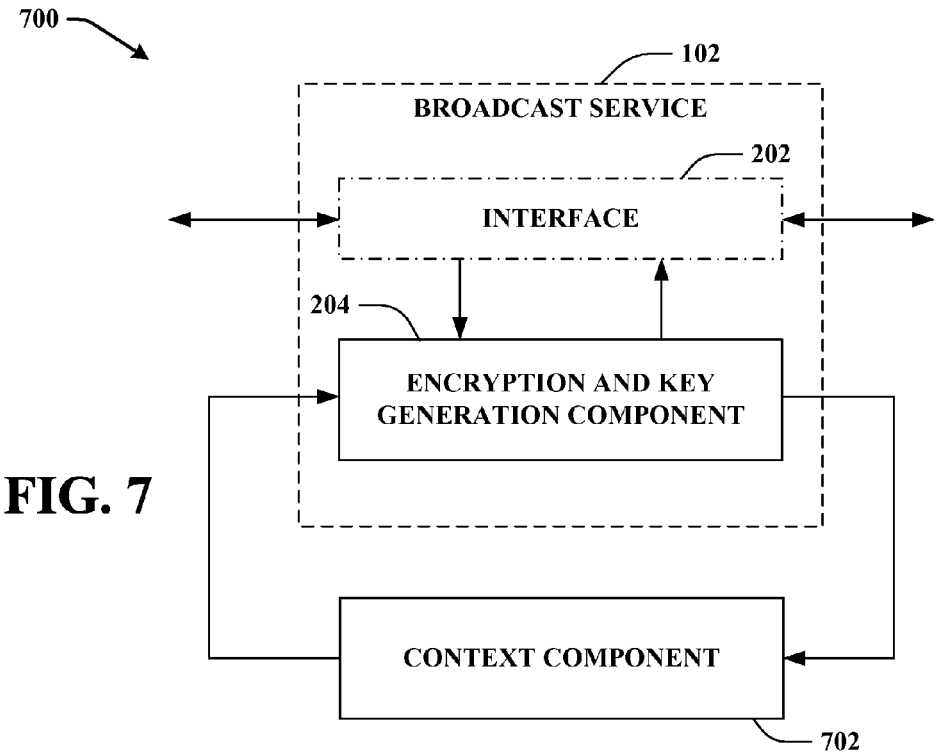
FIG. 7 depicts a further illustrative aspect of the machine implemented system that asynchronously distributes multimedia content in accordance with an aspect of the claimed subject matter.

FIG. 7 provides a further illustration of a system 700 that can effectuate and facilitate the asynchronous download of multimedia presentations and content in accordance with an aspect of the claimed subject matter. As illustrated encryption and key generation component 204 can, for example, employ context component 702 to determine context associated with a particular action or set of input data. As can be appreciated, context can play an important role with respect understanding meaning associated with particular sets of input, or intent of an individual or entity. For example, many words or sets of words can have double meanings (e.g., double entendre), and without proper context of use or intent of the words the corresponding meaning can be unclear thus leading to increased probability of error in connection with interpretation or translation thereof. The context component 702 can provide current or historical data in connection with inputs to increase proper interpretation of inputs. For example, time of day may be helpful to understanding an input—in the morning, the word "drink" would likely have a high a probability of being associated with coffee, tea, or juice as compared to be associated with a soft drink or alcoholic beverage during late hours. Context can also assist in interpreting uttered words that sound the same (e.g., steak and, and stake). Knowledge that it is near dinnertime of the user as compared to the user campaign would greatly help in recognizing the following spoken words "I need a steak/stake". Thus, if the context component 702 had knowledge that the user was not camping, and that it was near dinnertime, the utterance would be interpreted as "steak". On the other hand, if the context component 702 knew (e.g., via GPS system input) that the user recently arrived at a camping ground within a national park; it might more heavily weight the utterance as "stake".

In view of the foregoing, it is readily apparent that utilization of the context component 702 to consider and analyze extrinsic information can substantially facilitate determining meaning of sets of inputs.

Figure 8:
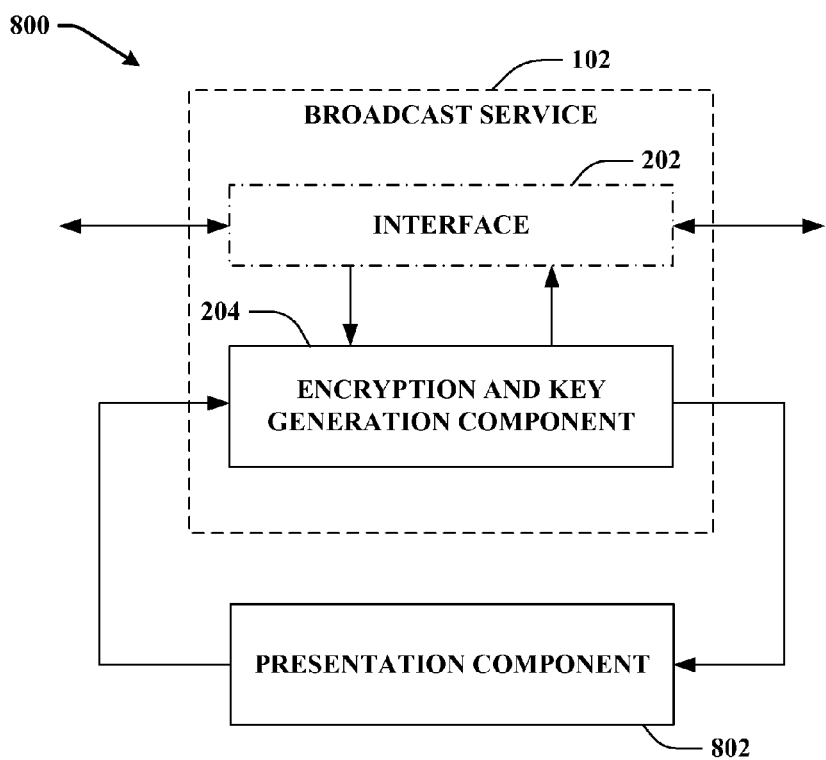
FIG. 8 illustrates another illustrative aspect of a system implemented on a machine that that asynchronously distributes multimedia content in accordance of yet another aspect of the claimed subject matter.

FIG. 8 a further illustration of a system 800 that effectuates and facilitates asynchronous download of multimedia presentations in accordance with an aspect of the claimed subject matter. As illustrated, system 800 can include presentation component 802 that can provide various types of user interface to facilitate interaction between a user and any component coupled to encryption and key generation component 204. As illustrated, presentation component 802 is a separate entity that can be utilized with detection component. However, it is to be appreciated that presentation component 802 and/or other similar view components can be incorporated into encryption and key generation component 204 and/or a standalone unit. Presentation component 802 can provide one or more graphical user interface, command line interface, and the like. For example, the graphical user interface can be rendered that provides the user with a region or means to load, import, read, etc., data, and can include a region to present the results of such. These regions can comprise known text and/or graphic regions comprising dialog boxes, static controls, drop-down menus, list boxes, pop-up menus, edit controls, combo boxes, radio buttons, check boxes, push buttons, and graphic boxes. In addition, utilities to facilitate the presentation such as vertical and/or horizontal scrollbars for navigation and toolbar buttons to determine whether a region will be viewable can be employed. For example, the user can interact with one or more of the components coupled and/or incorporated into encryption and key generation component 204.

Users can also interact with regions to select and provide information via various devices such as a mouse, roller ball, keypad, keyboard, and/or voice activation, for example. Typically, the mechanism such as a push button or the enter key on the keyboard can be employed subsequent to entering the information in order to initiate, for example, a query. However, it is to be appreciated that the claimed subject matter is not so limited. For example, nearly highlighting a checkbox can initiate information conveyance. In another example, a command line interface can be employed. For example, the command line interface can prompt (e.g., via text message on a display and an audio tone) the user for information via a text message. The user can then provide suitable information, such as alphanumeric input corresponding to an option provided in the interface prompt or an answer to a question posed in the prompt. It is to be appreciated that the command line interface can be employed in connection with a graphical user interface and/or application programming interface (API). In addition, the command line interface can be employed in connection with hardware (e.g., video cards) and/or displays (e.g., black-and-white, and EGA) with limited graphic support, and/or low bandwidth communication channels.

Figure 9:
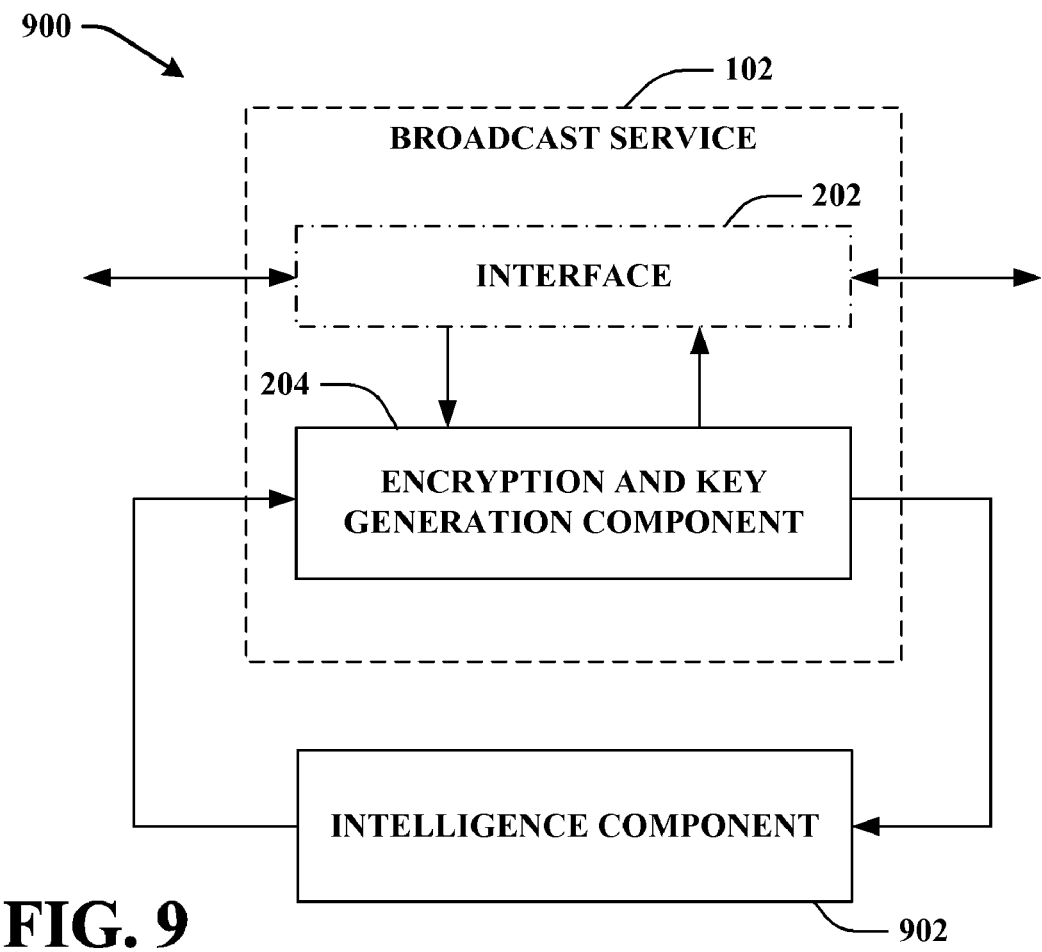
FIG. 9 depicts yet another illustrative aspect of a system that effectuates and facilitates encapsulation of metadata within watermarks that can be associated with multimedia segments or presentations in accordance with an aspect of the subject matter as claimed.

FIG. 9 depicts a system 900 that employs artificial intelligence to effectuate and facilitate encapsulation of metadata within watermarks that can be associated with multimedia segments or presentations in accordance with an aspect of the subject matter as claimed. Accordingly, as illustrated, system 900 can include an intelligence component 902 that can be utilized, for example, to dynamically ascertain one or more of threshold wait times, and/or respective locations of broadcast service 102 and personal video recorder/re-broadcast service 106. Intelligence component 902 can employ a probabilistic based or statistical based approach, for example, in connection with making determinations or inferences. Inferences can be based in part upon explicit training of classifiers (not shown) before employing system 100, or implicit training based at least in part upon system feedback and/or users previous actions, commands, instructions, and the like during use of the system. Intelligence component 902 can employ any suitable scheme (e.g., numeral networks, expert systems, Bayesian belief networks, support vector machines (SVMs), Hidden Markov Models (HMMs), fuzzy logic, data fusion, etc.) in accordance with implementing various automated aspects described herein. Intelligence component 902 can factor historical data, extrinsic data, context, data content, state of the user, and can compute cost of making an incorrect determination or inference versus benefit of making a correct determination or inference. Accordingly, a utility-based analysis can be employed with providing such information to other components or taking automated action. Ranking and confidence measures can also be calculated and employed in connection with such analysis.

Figure 10:
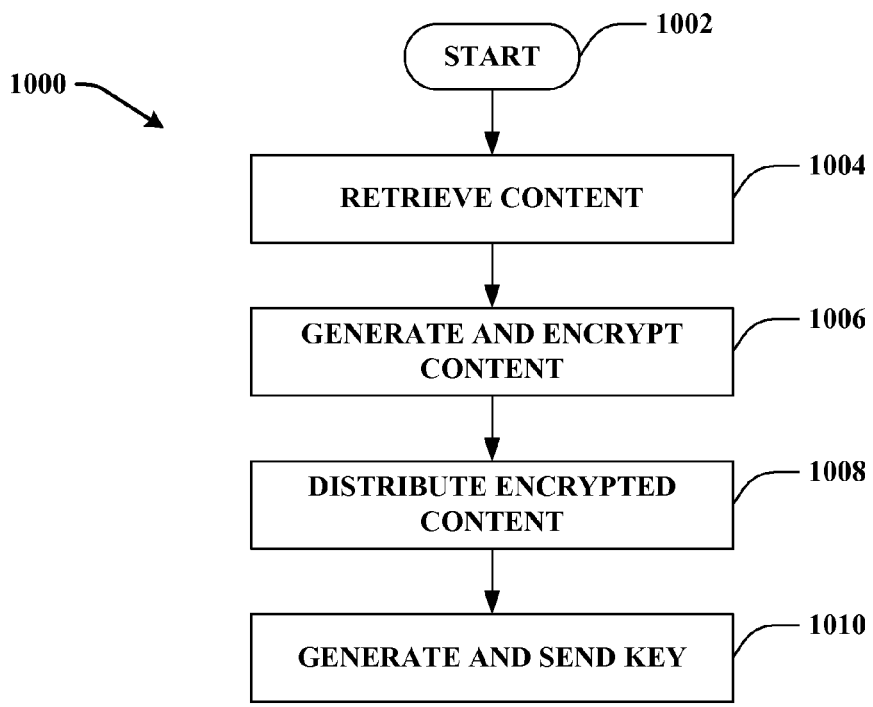
FIG. 10 illustrates a flow diagram of a machine implemented methodology that that asynchronously distributes multimedia content in accordance with an aspect of the claimed subject matter.
Figure 11:
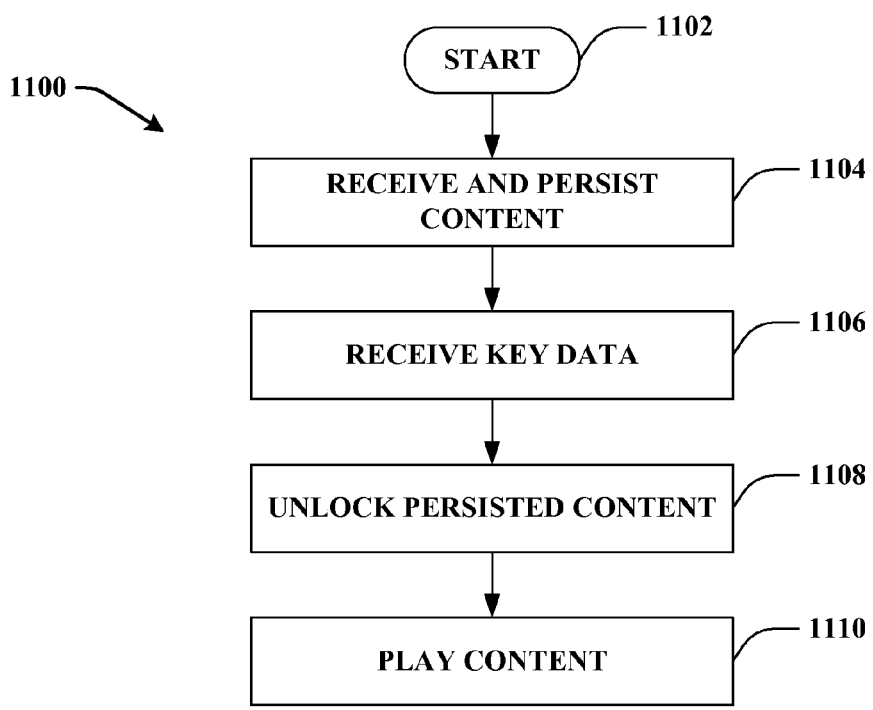
FIG. 11 illustrates a flow diagram of a machine implemented methodology that that asynchronously receives multimedia content in accordance with a further aspect of the claimed subject matter.

In view of the exemplary systems shown and described supra, methodologies that may be implemented in accordance with the disclosed subject matter will be better appreciated with reference to the flow charts of FIG. 10-11. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed hereinafter and throughout this specification are capable of being stored on an article of manufacture to facilitate transporting and transferring such methodologies to computers.

The claimed subject matter can be described in the general context of computer-executable instructions, such as program modules, executed by one or more components. Generally, program modules can include routines, programs, objects, data structures, etc. that perform particular tasks or implement particular abstract data types. Typically the functionality of the program modules may be combined and/or distributed as desired in various aspects.

FIG. 10 depicts an illustrative methodology 1000 that can be implemented on a broadcast service. At 1002 various and sundry initializations tasks and processes can be undertaken after which method 1000 can proceed to 1004. At 1004 methodology 1000 can retrieve multimedia content and/or collect diverse and disparate program information from various multimedia producers (e.g., music studios, film studios, and the like). At 1006, once such multimedia content has been collected and/or retrieved the content can be encrypted and/or locked with one or more encryption and/or time sensitive keys. At 1008 the encrypted and/or locked multimedia content can be distributed to various clients that can persist the received encrypted and locked multimedia content for future retransmission and/or playback, for example. At 1010 a key needed to unlock and/or decrypt previously disseminated and/or concurrently distributing locked and/or encrypted content can be generated and sent to the various clients that persisted, or are currently in the process of playing back the locked and/or encrypted content.

FIG. 11 depicts an illustrative methodology 1100 that can be implemented on a personal video recorder/re-broadcast server in accordance with an aspect of the claimed subject matter. At 1102 various and sundry initialization processes and tasks can be taken after which the methodology can proceed to 1104. At 1104 encrypted and/or locked multimedia content can be received from a broadcast service and persisted, for example. At 1106 methodology 1100 can receive, from broadcast server, a key necessary to decrypt and/or unlock previously received and persisted multimedia content. Upon receipt of the appropriate key at 1108 assists content can be unlocked and thereafter and 1110 the decrypted and 4/all unlock multimedia content can be played back to an associated audio/visual display, for example.

The claimed subject matter can be implemented via object oriented programming techniques. For example, each component of the system can be an object in a software routine or a component within an object. Object oriented programming shifts the emphasis of software development away from function decomposition and towards the recognition of units of software called "objects" which encapsulate both data and functions. Object Oriented Programming (OOP) objects are software entities comprising data structures and operations on data. Together, these elements enable objects to model virtually any real-world entity in terms of its characteristics, represented by its data elements, and its behavior represented by its data manipulation functions. In this way, objects can model concrete things like people and computers, and they can model abstract concepts like numbers or geometrical concepts.

The benefit of object technology arises out of three basic principles: encapsulation, polymorphism and inheritance. Objects hide or encapsulate the internal structure of their data and the algorithms by which their functions work. Instead of exposing these implementation details, objects present interfaces that represent their abstractions cleanly with no extraneous information. Polymorphism takes encapsulation one-step further—the idea being many shapes, one interface. A software component can make a request of another component without knowing exactly what that component is. The component that receives the request interprets it and figures out according to its variables and data how to execute the request. The third principle is inheritance, which allows developers to reuse pre-existing design and code. This capability allows developers to avoid creating software from scratch. Rather, through inheritance, developers derive subclasses that inherit behaviors that the developer then customizes to meet particular needs.

In particular, an object includes, and is characterized by, a set of data (e.g., attributes) and a set of operations (e.g., methods), that can operate on the data. Generally, an object's data is ideally changed only through the operation of the object's methods. Methods in an object are invoked by passing a message to the object (e.g., message passing). The message specifies a method name and an argument list. When the object receives the message, code associated with the named method is executed with the formal parameters of the method bound to the corresponding values in the argument list. Methods and message passing in OOP are analogous to procedures and procedure calls in procedure-oriented software environments.

However, while procedures operate to modify and return passed parameters, methods operate to modify the internal state of the associated objects (by modifying the data contained therein). The combination of data and methods in objects is called encapsulation. Encapsulation provides for the state of an object to only be changed by well-defined methods associated with the object. When the behavior of an object is confined to such well-defined locations and interfaces, changes (e.g., code modifications) in the object will have minimal impact on the other objects and elements in the system.

Each object is an instance of some class. A class includes a set of data attributes plus a set of allowable operations (e.g., methods) on the data attributes. As mentioned above, OOP supports inheritance—a class (called a subclass) may be derived from another class (called a base class, parent class, etc.), where the subclass inherits the data attributes and methods of the base class. The subclass may specialize the base class by adding code which overrides the data and/or methods of the base class, or which adds new data attributes and methods. Thus, inheritance represents a mechanism by which abstractions are made increasingly concrete as subclasses are created for greater levels of specialization.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Artificial intelligence based systems (e.g., explicitly and/or implicitly trained classifiers) can be employed in connection with performing inference and/or probabilistic determinations and/or statistical-based determinations as in accordance with one or more aspects of the claimed subject matter as described hereinafter. As used herein, the term "inference," "infer" or variations in form thereof refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

Furthermore, all or portions of the claimed subject matter may be implemented as a system, method, apparatus, or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Some portions of the detailed description have been presented in terms of algorithms and/or symbolic representations of operations on data bits within a computer memory. These algorithmic descriptions and/or representations are the means employed by those cognizant in the art to most effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

Figure 12:
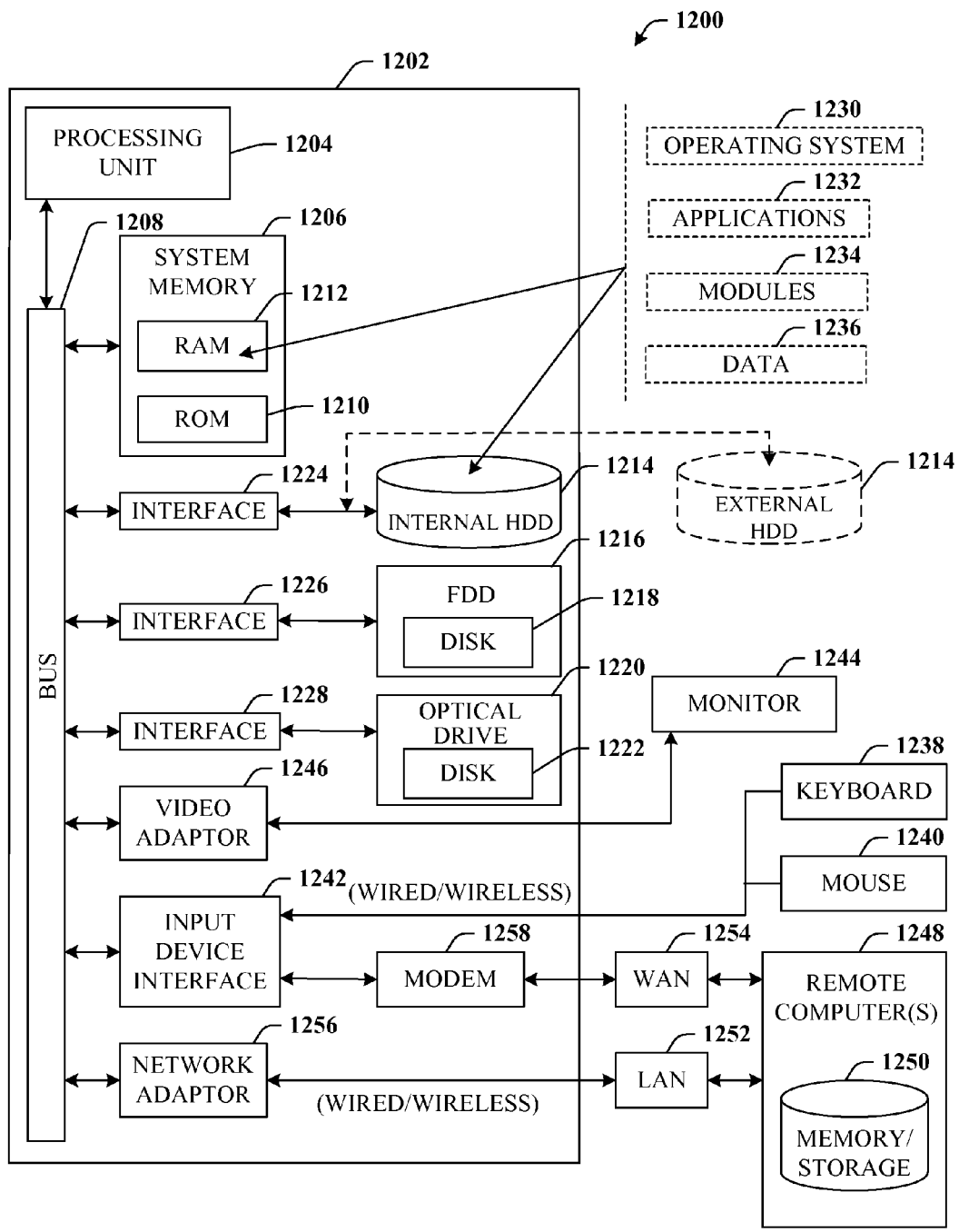
FIG. 12 illustrates a block diagram of a computer operable to execute the disclosed system in accordance with an aspect of the claimed subject matter.

Referring now to FIG. 12, there is illustrated a block diagram of a computer operable to execute the disclosed system. In order to provide additional context for various aspects thereof, FIG. 12 and the following discussion are intended to provide a brief, general description of a suitable computing environment 1200 in which the various aspects of the claimed subject matter can be implemented. While the description above is in the general context of computer-executable instructions that may run on one or more computers, those skilled in the art will recognize that the subject matter as claimed also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 12, the exemplary environment 1200 for implementing various aspects includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures may also be employed as the processing unit 1204.

The system bus 1208 can be any of several types of bus structure that may further interconnect to a memory bus (with or without a memory controller), a peripheral bus, and a local bus using any of a variety of commercially available bus architectures. The system memory 1206 includes read-only memory (ROM) 1210 and random access memory (RAM) 1212. A basic input/output system (BIOS) is stored in a non-volatile memory 1210 such as ROM, EPROM, EEPROM, which BIOS contains the basic routines that help to transfer information between elements within the computer 1202, such as during start-up. The RAM 1212 can also include a high-speed RAM such as static RAM for caching data.

The computer 1202 further includes an internal hard disk drive (HDD) 1214 (e.g., EIDE, SATA), which internal hard disk drive 1214 may also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1394 interface technologies. Other external drive connection technologies are within contemplation of the claimed subject matter.

The drives and their associated computer-readable media provide nonvolatile storage of data, data structures, computer-executable instructions, and so forth. For the computer 1202, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed and claimed subject matter.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is to be appreciated that the claimed subject matter can be implemented with various commercially available operating systems or combinations of operating systems.

A user can enter commands and information into the computer 1202 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 1394 serial port, a game port, a USB port, an IR interface, etc.

A monitor 1244 or other type of display device is also connected to the system bus 1208 via an interface, such as a video adapter 1246. In addition to the monitor 1244, a computer typically includes other peripheral output devices (not shown), such as speakers, printers, etc.

The computer 1202 may operate in a networked environment using logical connections via wired and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which may connect to a global communications network, e.g., the Internet.

When used in a LAN networking environment, the computer 1202 is connected to the local network 1252 through a wired and/or wireless communication network interface or adapter 1256. The adaptor 1256 may facilitate wired or wireless communication to the LAN 1252, which may also include a wireless access point disposed thereon for communicating with the wireless adaptor 1256.

When used in a WAN networking environment, the computer 1202 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 via the serial port interface 1242. In a networked environment, program modules depicted relative to the computer 1202, or portions thereof, can be stored in the remote memory/storage device 1250. It will be appreciated that the network connections shown are exemplary and other means of establishing a communications link between the computers can be used.

The computer 1202 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11x (a, b, g, etc.) to provide secure, reliable, fast wireless connectivity. A Wi-Fi network can be used to connect computers to each other, to the Internet, and to wired networks (which use IEEE 802.3 or Ethernet).

Wi-Fi networks can operate in the unlicensed 2.4 and 5 GHz radio bands. IEEE 802.11 applies to generally to wireless LANs and provides 1 or 2 Mbps transmission in the 2.4 GHz band using either frequency hopping spread spectrum (FHSS) or direct sequence spread spectrum (DSSS). IEEE 802.11a is an extension to IEEE 802.11 that applies to wireless LANs and provides up to 54 Mbps in the 5 GHz band. IEEE 802.11a uses an orthogonal frequency division multiplexing (OFDM) encoding scheme rather than FHSS or DSSS. IEEE 802.11b (also referred to as 802.11 High Rate DSSS or Wi-Fi) is an extension to 802.11 that applies to wireless LANs and provides 11 Mbps transmission (with a fallback to 5.5, 2 and 1 Mbps) in the 2.4 GHz band. IEEE 802.11g applies to wireless LANs and provides 20+ Mbps in the 2.4 GHz band. Products can contain more than one band (e.g., dual band), so the networks can provide real-world performance similar to the basic 10BaseT wired Ethernet networks used in many offices.

Figure 13:
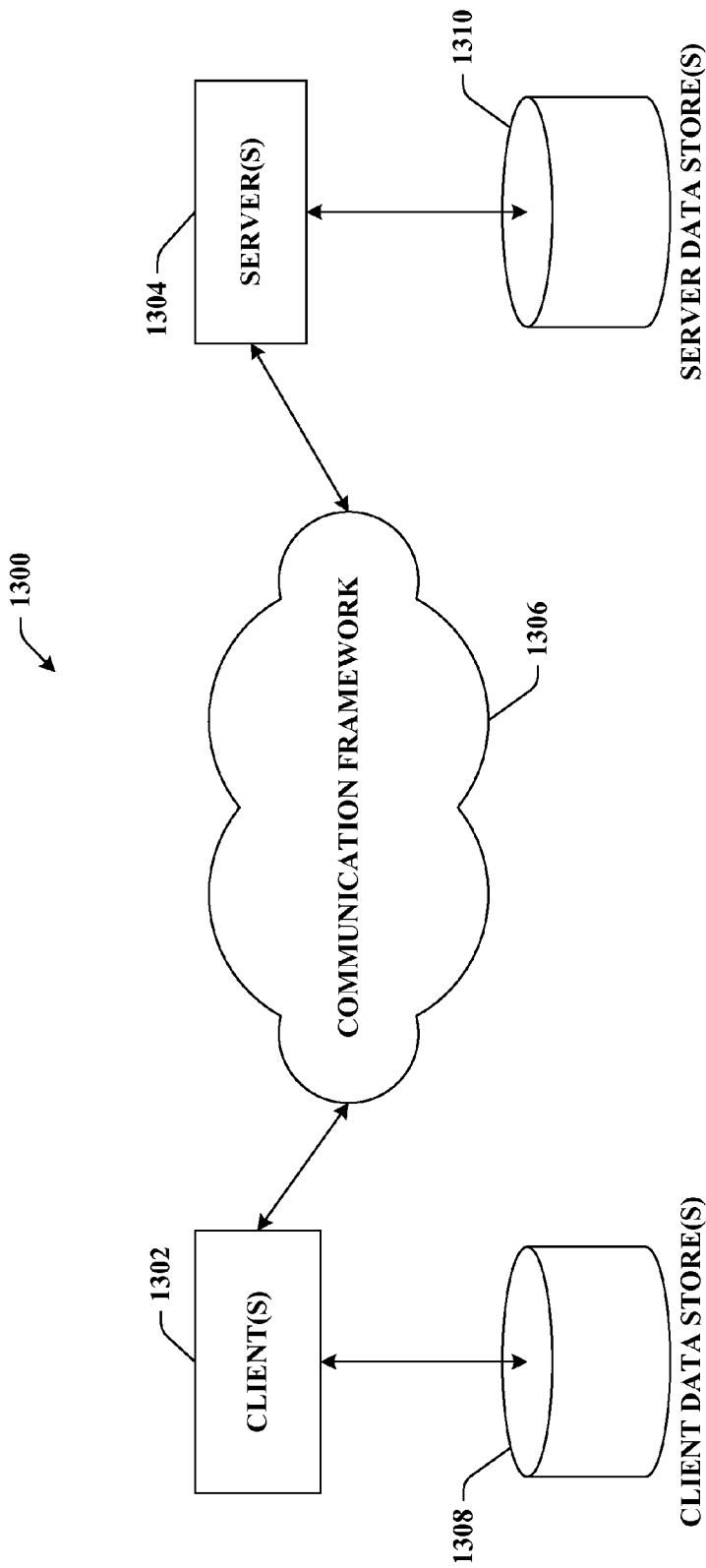
FIG. 13 illustrates a schematic block diagram of an exemplary computing environment for processing the disclosed architecture in accordance with another aspect.

Referring now to FIG. 13, there is illustrated a schematic block diagram of an exemplary computing environment 1300 for processing the disclosed architecture in accordance with another aspect. The system 1300 includes one or more client(s) 1302. The client(s) 1302 can be hardware and/or software (e.g., threads, processes, computing devices). The client(s) 1302 can house cookie(s) and/or associated contextual information by employing the claimed subject matter, for example.

The system 1300 also includes one or more server(s) 1304. The server(s) 1304 can also be hardware and/or software (e.g., threads, processes, computing devices). The servers 1304 can house threads to perform transformations by employing the claimed subject matter, for example. One possible communication between a client 1302 and a server 1304 can be in the form of a data packet adapted to be transmitted between two or more computer processes. The data packet may include a cookie and/or associated contextual information, for example. The system 1300 includes a communication framework 1306 (e.g., a global communication network such as the Internet) that can be employed to facilitate communications between the client(s) 1302 and the server(s) 1304.

Communications can be facilitated via a wired (including optical fiber) and/or wireless technology. The client(s) 1302 are operatively connected to one or more client data store(s) 1308 that can be employed to store information local to the client(s) 1302 (e.g., cookie(s) and/or associated contextual information). Similarly, the server(s) 1304 are operatively connected to one or more server data store(s) 1310 that can be employed to store information local to the servers 1304.

What has been described above includes examples of the disclosed and claimed subject matter. It is, of course, not possible to describe every conceivable combination of components and/or methodologies, but one of ordinary skill in the art may recognize that many further combinations and permutations are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system implemented on a machine that asynchronously distributes multimedia content, comprising:
one or more processors;
an interface component that receives multimedia content supplied by a multimedia publisher;
an encryption and key generation component, executable by the one or more processors, that applies a time-sensitive lock to the multimedia content and disseminates the locked multimedia content to a plurality of disparate clients for storage to associated storage media, and at a later time disseminates a time sync signal that unlocks the locked multimedia content for playback at predetermined times established by the system, wherein the time-sensitive lock includes a time-sensitive key disseminated concurrently with the time-sensitive lock and the locked multimedia content in a first time interval, the time-sensitive lock being unlocked by the time sync signal generated by the encryption and key generation component in a plurality of subsequent time intervals, thereby controlling when users can view different portions of the multimedia content;
a synthesizing component that filters information received from a variety of inputs; and
a context summary component that determines context associated with the variety of inputs and disseminates the locked multimedia content or the predetermined time sync signal based on the context.

2. The system of claim 1, wherein the encryption and key generation component generates the time sync signal that unlocks the locked multimedia content.

3. The system of claim 1, wherein the time-sensitive lock includes credentials specific to the encryption and key generation component.

4. The system of claim 3, wherein the credentials include an IP address, a Media Access Control (MAC) address, or a domain name associated with the encryption and key generation component.

5. The system of claim 1, wherein the multimedia publisher supplies audio or visual multimedia content, or a combination thereof.

6. The system of claim 1, wherein the encryption and key generation component employs asymmetric encryption or symmetric encryption to lock the multimedia content.

7. The system of claim 1, wherein the plurality of disparate clients include cell phones, smart phone, portable multimedia players, multimedia Internet enabled mobile phones, or personal video recorders.

8. The system of claim 1, wherein the encryption and key generation component locks randomly selected bits of the multimedia content.

9. The system of claim 1, wherein the encryption and key generation component locks every bit included in the multimedia content.

10. The system of claim 1, wherein the multimedia content is a movie, a television program, a music album or a pod cast.

11. A machine implemented method that asynchronously downloads multimedia programs, comprising:
receiving content from a multimedia broadcaster;
encrypting, by one or more processors configured with executable instructions, the content with a time-centric cipher;
distributing the encrypted content and the time-centric cipher to a client during a first time interval;
generating a counterpart to the time-centric cipher configured to decrypt the encrypted content; and
disseminating the counterpart to the time-centric cipher during a plurality of predetermined time sync intervals established by a broadcast service, the counterpart to the time-centric cipher controlling when the client is permitted to playback different portions of the content in accordance with the predetermined time sync intervals.

12. The method of claim 11, wherein the client persists the encrypted content on associated storage media.

13. The method of claim 11, wherein the encrypting includes encrypting every block included in the content.

14. The method of claim 11, wherein the encrypting includes encrypting selected blocks of the content.

15. The method of claim 11, wherein the content is a movie, a television program, a music album or a pod cast.

16. A system that asynchronously disseminates multimedia content, comprising:
means for obtaining multimedia content from a content provider;
means for imposing a time-centric encryption technique on the multimedia content to create a time-locked media bundle that includes a token configured to synchronize the time-locked media bundle with the system subsequent to distribution;
means for distributing the time-locked media bundle to one or more client devices during a first time interval; and
means for generating a time key to unlock the time-locked media bundle at a plurality of pre-determined future time intervals established by the system, wherein the time key is configured to sync with the token distributed to the one or more client devices in the time-locked bundle, and the time key controls when the one or more client devices can play-back respective portions of the multimedia content distributed via the time-locked media bundle.

17. The system of claim 16, wherein the multimedia content is a movie, a television program, a music album or a pod cast.

* * * * *